Aug. 20, 1968  R. E. KUBA  3,398,292
CURRENT SUPPLY APPARATUS
Filed July 19, 1965  3 Sheets-Sheet 1
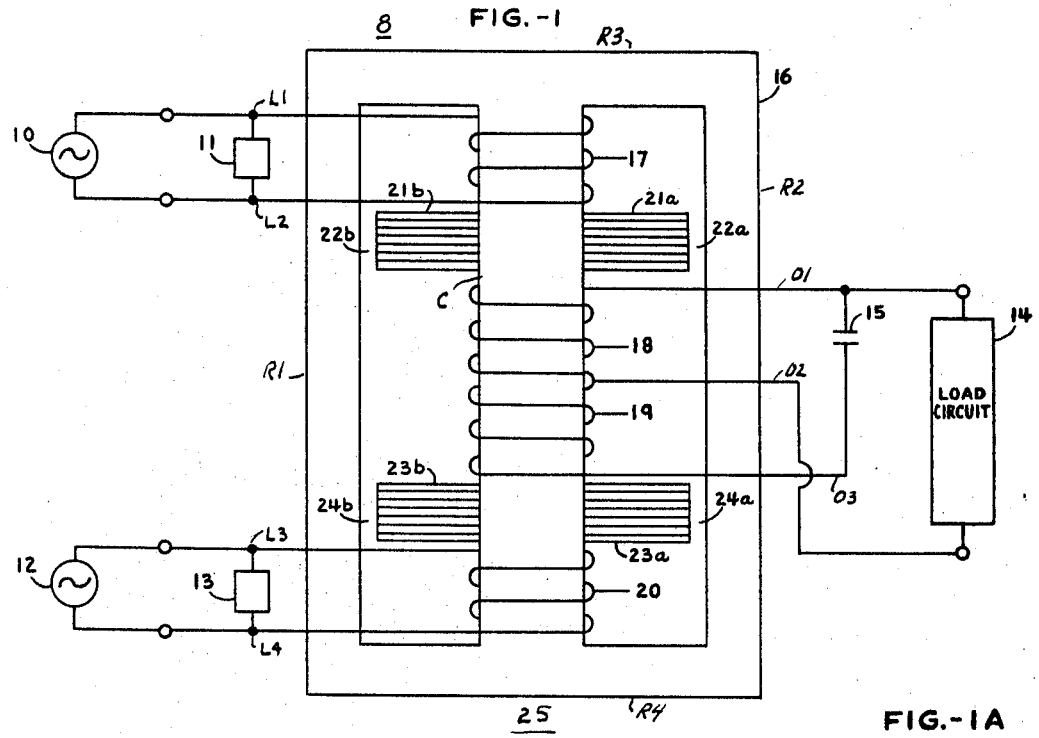
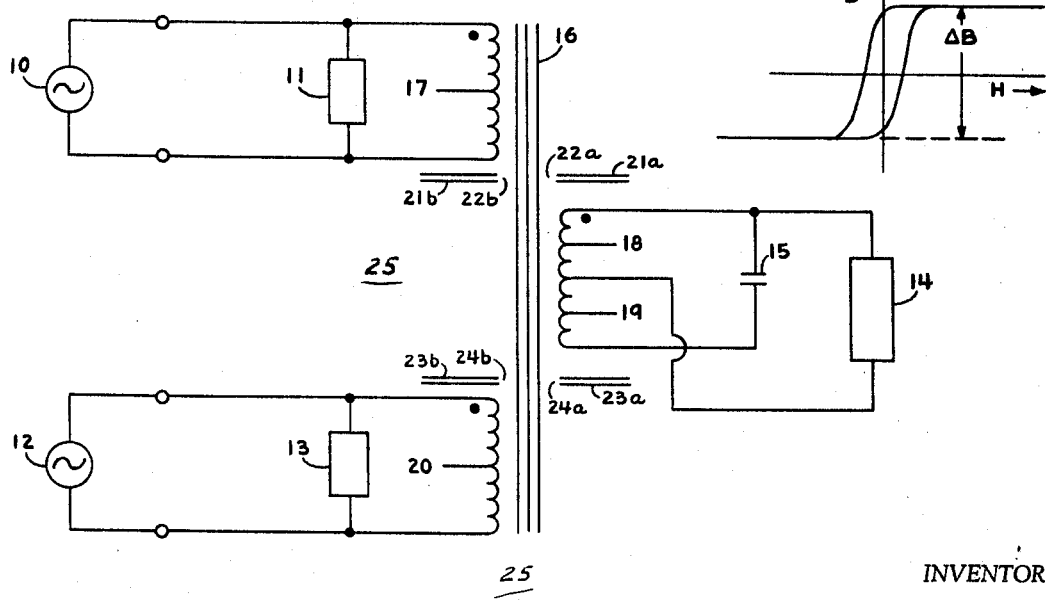
INVENTOR
RICHARD E. KUBA
BY
ATTORNEYS Aug. 20, 1968

R. E. KUBA 3,398,292

CURRENT SUPPLY APPARATUS

Filed July 19, 1965

INVENTOR

RICHARD E. KUBA

BY *Brown Jackson Boettcher & Dienner*

ATTORNEYS

INVENTOR

RICHARD E. KUBA

United States Patent Office 3,398,292
Patented Aug. 20, 1968

3,398,292
CURRENT SUPPLY APPARATUS
Richard E. Kuba, Columbus, Ohio, assignor to North Electric Company, Galion, Ohio, a corporation of Ohio
Filed July 19, 1965, Ser. No. 472,826
14 Claims. (Cl. 307—51)

This invention relates to current supply apparatus and more particularly to apparatus for providing a substantially uninterrupted, instantaneous output voltage to a load from two independent sources of input voltage even though either one of said input sources may be temporarily or permanently deenergized.

It is a further object of this invention to provide an apparatus which is arranged to be connected to two input voltage sources and which provides a substantially uninterrupted, instantaneous output voltage upon failure of either one of its two input voltage sources without using any switching mechanism of either a mechanical or solid state electrical nature.

Another object of this invention is to provide an apparatus which is arranged to be connected to two input voltage sources and which provides a substantially uninterrupted, instantaneous output voltage, upon failure of either of its input voltage sources, without feeding any appreciable amount of power from the input source which is still operable to the input terminals connected to the other source which has failed, and which may still have a low impedance load connected across its said terminals.

Another object of this invention is to provide a device of such type which provides substantially uninterrupted, instantaneous, output voltage to a load from two independent sources of alternating current having identical frequencies, including sources which may have appreciable phase difference between their waveforms or appreciable differences in the waveshape of their voltage waveforms.

There are many applications in the field where it is extremely desirable to have so-called "no-break" service wherein a source of alternating current will provide a substantially, uninterrupted instantaneous voltage to a load even though a power failure has occurred on a primary source. One instance of such need is the field exemplified by power supplies for electronic computers where a loss of power may result in loss of memory storage, invalidate a lengthy calculation, and, in general, completely disable the functioning of the computer.

In accordance with the invention, specific embodiments of which are herein described for the purpose of illustration, two discrete sources of alternating current having the same frequency supply current to a load; however, the waveforms and the relative phase positions of the voltages of these two sources may be substantially different. The two sources of alternating current may be supplied, for example, commercial power sources having distinctly separate transmission line paths from the point of utilization of power to a main distribution substation. The probability of a fault occurring simultaneously on each of these independent transmission paths would be very small. By way of further example, one of the sources may be a source of commercial power, and the other source may be the output of a diesel generator set synchronized so that the frequency of each source would be identical, although the waveshapes and phase positions of these sources could be substantially different. In still another example, one of the sources might be a source of commercial power and the other source might be the output of an inverter fed from a battery. These sources would be so synchronized that the frequencies of the sources would be identical, although the waveshape and phase positions of these sources could be substantially different.

In each of these exemplary installations the resistance or reactance, or both, of the load may change.

In one form of the novel apparatus of the invention, which is operative to provide the desired "no-break" service, there is provided a transformer comprising in combination, a core, a first primary winding, a second primary winding, and a secondary winding on the core, a first high reluctance magnetic shunt placed between the first primary winding and the secondary winding, and a second high reluctance magnetic shunt placed between the second primary winding and the secondary winding.

Current from the first current supply source is fed into the first primary winding, and current from the second current supply souce is fed into the second primary winding. A capacitor is connected across the transformer secondary winding and the load is connected across a portion of the secondary winding.

When both sources of supply are connected to their respective primary windings, a ferroresonant action occurs in the series combination of the secondary winding and the capacitor. The ferroresonant effect causes the portion of the core around which the secondary winding is wound to be driven into magnetic saturation in each direction of magnetization on alternate cycles of the supply voltage. Because the total change in magnetic flux threading the secondary coil remains substantially constant (being the difference between the upper and lower saturation levels) the output voltage which is proportional to this change in flux will be substantially constant irrespective of input line changes and output load changes. The output power will be supplied in part from each input source, being nearly equally shared if the construction of the transformer is symmetrical.

If now, either one of the power sources should, because of failure, become disconnected from its respective input winding even though a low impedance is still connected across the input winding terminals, the transformer will continue to maintain a ferroresonant condition of operation in its output winding, the load power now being entirely supplied by the power source which is still operable.

Any voltage induced by transformer action into the primary winding which has been disconnected from its source may produce a current which can flow through the disconnected primary winding and through any impedance connected across said primary winding. The flux of this current, however, will in the greatest part flow through the magnetic shunt which separates such primary winding and the secondary winding and will not penetrate the secondary winding to any substantial extent. The deenergized primary winding with its load in parallel behaves as the secondary winding of a very high reactance transformer and, therefore, exhibits a very high load voltage regulation. Thus, even though the effective load impedance is very low, approaching a short circuit, very little power will flow from the operable one of the sources to the circuit associated with the primary winding which has been disconnected from its source. When the source of power which had failed is reestablished, the transformer automatically returns to its original condition of operation, in which the power to the load is supplied by both input source. This entire "no break" operation is accomplished without any mechanical switching or the use of any solid state devices.

These and other objects and features of the invention will be best understood by reference to the following description taken in connection with the accompanying drawings, in which:

FIGURE 1 is a sectional view of a current supply circuit embodying the invention;

FIGURE 1a is a B–H curve used to explain the operation of the current supply apparatus of FIGURE 1;

FIGURE 2 is a schematic representation of the current supply circuit of FIGURE 1;

Figure 3:
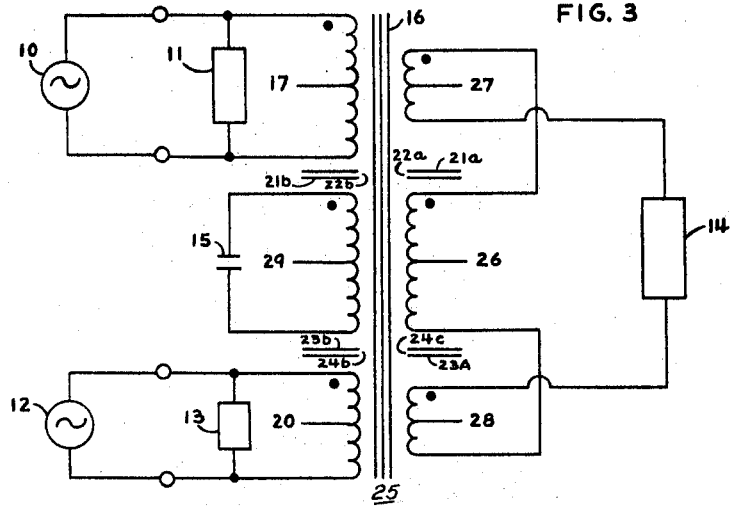
FIGURE 3 is a schematic view of a modification of the current supply circuit of FIGURE 1.

Referring now to the drawings, one preferred embodiment of the invention is shown in FIGURE 1. As there illustrated the novel apparatus 8 includes a first pair of terminals L1, L2 for connection to a first source of alternating current 10, and a second pair of terminals L3, L4 for connection to a second source of alternating current 12. The second source 12 has the same frequency as source 10, but the waveforms and phase angle displacements of sources 10 and 12 may be substantially different. A load 11 is connected in parallel with source 10, which load may be both resistive and reactive, and represents in part the effective load supplied by source 10.

If source 10 should develop a fault such that it is disconnected from the apparatus 8, there will still be a certain fraction of the load which source 10 was supplying previous to the fault connected to such apparatus. This fraction of load will vary depending on the exact physical location of the fault in the power supply system associated with source 10. In a similar manner a load 13, connected in parallel with source 12, may be both resistive and reactive and represents in part the effective load supplied by source 12.

Input terminals L1, L2 connect source 10 and its equivalent load 11 to a first primary winding 17 of a transformer 25. Input terminals L3, L4 connect source 12 and its equivalent load 13 to second primary winding 20 of transformer 25. In the embodiment of FIGURE 1, primary windings 17 and 20 and secondary windings 18 and 19 are wound on a core 16 which core may be made of laminations each of which is in the form of a rectangle having a first and second side leg R1, R2, an upper leg R3, and a lower leg R4, and a center leg C which extends parallel to outer legs R1, R2. The laminations are made of suitable material such as, for example, 29 gauge grain-oriented silicon steel. The core 16, as shown, consists of E-shaped and I-shaped laminations interleaved. By way of example the E-shaped laminations may comprise legs R1, R2, R3, and C, and the I-shaped laminations may comprise leg R4. There are also provided I-shaped laminations 21a, 21b, 23a, and 23b which are butt joined to the center leg of core 16 and run transverse to the direction of the center leg of core 16. The I-shaped laminations 21a, 21b, 23a, 23b form magnetic shunt paths which are disposed between primary winding 17 and secondary windings 18 and 19 and between primary winding 20 and secondary windings 18 and 19 respectively. Non-magnetic air gaps 22a, 22b, are provided for by the ends of laminations 21a, 21b with the adjacent portions of legs R1, R2 and such gaps adjust the reluctance of the magnetic shunt paths formed by I-shaped laminations 21a, 21b. In a similar manner the ends of laminations 23a, 23b form air gaps 24a, 24b with the adjacent portions of sides R1, R2. A capacitor 15 is connected between output conductors O1, O3 and thereby across secondary windings 18 and 19. A load circuit 14 which may be both resistive and reactive is connected across the output conductors O1, O2 and thereby across secondary winding 18.

The principle of operation of the invention may be explained as follows with reference to FIGURES 1 and 2, the latter figure being a schematic reproduction of the circuit shown in FIGURE 1. Sources 10 and 12 are connected to their respective primary windings 17 and 20 in such a manner that the current flowing in windings 17 and 20 produce fluxes in the portion of the center leg C of core 16 on which secondary windings 18 and 19 are wound which are additive in center leg C. The next flux in the center leg C which threads secondary windings 18 and 19 induces a voltage in windings 18 and 19. The combination of windings 18 and 19 with capacitor 15 is selected (as set forth in the specific example detailed) so that a ferroresonant condition of operation develops in the magnetic material making up that portion of the center leg C of core 16 on which secondary windings 18 and 19 are wound. The ferroresonant action causes this magnetic material to be driven far into magnetic saturation in each direction of magnetic polarity as the voltage of windings 18 and 19 passes through its alternate positive and negative half cycles.

In order to initiate ferroresonant action in that portion of the center leg around which the output winding is wound, it is only necessary to establish a minimum amount of magnetic flux in this center leg. Once this minimum amount of flux is available, the ferroresonant process establishes itself by a self build-up process well understood by those skilled in the art. Now, as the phase angle between the two input source voltages increase from zero to 180°, the resultant magnetic flux (which is a vectorial addition of the two magnetic fluxes set up by current from each source flowing in its respective input winding) is made to be greater than the minimum magnetic flux required for ferroresonant action for phase angle differences of from 0° to the neighborhood of 170°.

Because of the resonant action of the tank circuit composed of the secondary winding and the capacitor 15, the impedance of this resonant circuit to frequencies other than the fundamental frequency of the sources, will be very high, and, hence, the harmonics of the source voltages, which would contribute to differences in the waveforms of the source voltages, will have little effect on the ferroresonant mode of oscillation which establishes itself in the center leg.

FIGURE 1a depicts the magnetization characteristic of the magnetic material under ferroresonant action. This magnetization characteristic will remain substantially the same when the secondary winding 18 is loaded from no load to the full load rating of the device, or when the magnitudes of either source voltage 10 or 12 are reduced or increased a small percentage about their nominal values, provided the proper values (examples of which are given hereinafter) are chosen for the dimensions of core 16, the capacitance of capacitor 15, the dimensions of magnetic shunts 21a, 21b, 23a, 23b, the dimensions of air gaps 22a, 22b, 24a, 24b, and the number of turns and wire sizes of windings 17, 18, 19, and 20.

When the portion of the center tongue magnetic material on which secondary windings 18 and 19 are wound, exhibits the magnetization characteristic of FIGURE 1a because of ferroresonant action, the change in flux density $\Delta B$ in this magnetic material will be relatively constant regardless of changes in output loading 14, or changes in input line voltages 10 and 12. The voltage across winding 18 which is the same as the output voltage across load 14 will be given by $$V = NA \frac{\Delta B}{\Delta t}$$

where N is the number of turns on winding 18, A is the net cross sectional area of that portion of the center tongue on which winding 18 is wound. $\Delta B$ is the change in flux density in said portion of center tongue depicted in FIGURE 1a and $\Delta t$ is the time associated with a cycle of the input voltage. This equation shows that the output voltage will be substantially constant as long as $\Delta B$ (i.e. the change in flux density) is substantially constant. The device, therefore, regulates the output voltage for changes in both input line voltage and output loading and operates essentially as a ferroresonant transformer. Each source 10 and 12 supplies a portion of the power which appears at the load.

Now, if because of a fault, source 12 should become disconnected from winding 20, leaving the partial load 13 still connected to winding 20, the following actions take place:

(1) Ferroresonant action still continues in the magnetic material on the portion of the center tongue on which secondary windings 18 and 19 are wound since power is still supplied from source 10 to maintain the ferroresonant action. Most of the magnetic flux which threads windings 18 and 19 returns to these windings via a magnetic path through magnetic shunts 23a and 23b and air gaps 24a and 24b.

(2) Some of the flux threading windings 18 and 19 will return to these windings via a path down the center tongue through winding 20. A voltage will, therefore, be induced in winding 20 and current will flow through winding 20 and through load 13 connected across winding 20. Because of the magnetic shunt paths 23a and 23b and the air gaps 24a and 24b, winding 20 (under this condition of operation) behaves as a secondary winding of a very high reactance transformer and therefore exhibits a very large amount of voltage regulation as winding 20 supplies increased load current to load 13. Indeed, load 13 can be reduced to a short circuit without drawing an excessive amount of current from winding 20. Moreover, because winding 20 exhibits this great amount of voltage regulation as a function of its loading (under this condition of operation) winding 20 can supply only a very small amount of power to load 13. This means, that substanitally all the power supplied by source 10 to transformer input winding 17 appears at load 14 and only a negligibly small amount of power is fed from source 10 to load 13.

The device, therefore, provides instantaneously uninterrupted power to the load even though a fault has occurred on one of the input sources. (Source 12 in the example just outlined.) Of course, a similar operation would occur if both sources 10 and 12 were supplying power, and source 10 were to fail.

When the source, which has failed, returns to operation, the device also returns to its initial mode of operating by being fed from two separate sources. Such manner of control is accomplished without any mechanical or electronic solid state switching.

A 500 volt-ampere transformer of the type depicted in FIGURE 1 and operable in the manner described was built according to the following specifications. Core 16 was constructed of E and I laminations of 29 gauge grain-oriented silicon steel, the total stackup of laminations being 8.56". The E lamination (legs R1, R3, R2 and C) had a center leg C having a width of 1.812" and outside legs R1, R2 having a width of 1.125". The window width was 1.34" (i.e. between legs R1, R2 and the center core C) and the window height was 3.375". The I lamination (leg R4) has a width of 1.125" and a length of 6.75". Windings 17 and 20 consisted of 50 turns of #13 square copper wire each. Winding 18 consisted of 24 turns of #12 square copper wire and winding 19 consisted of 84 turns of #12 square copper wire. The magnetic shunt paths 21a, 21b, 23a, and 23b were made up of a 1 3/16" stackup, each, of 29 gauge grain-oriented steel. Each individual lamination comprising the shut paths 21a, 21b, 23a, and 23b had dimensions 8.8" x 1.330" x 0.014", with the 1.330" dimension lying between the center leg and an outside leg of core 16. Air gaps 22a, 22b, 24a, and 24b were 0.010" each. The sources 10 and 12 were 208 volts, 60 c.p.s. commercial sources of power. The capacitor 15 had a capacitance of 28 mfd.

The following data taken with the aforedescribed unit connected as shown under steady state conditions illustrates the operation of the device of FIGURE 1 under conditions when both sources 10 and 12 are operable, and also when one of the sources 12 has failed, and the impedance 13 associated with source 12 is replaced by a short circuit.

*Case I (both sources operable).*—Input voltage of source 10=208 volts, 60 c.p.s. Input voltage of source 12=208 volts, 60 c.p.s., output voltage across load 14=127.5 volts at 0 amperes current through load 14, and output voltage across load 14=126.5 volts at 4.5 amperes current through load 14, the load 14 being entirely resistive.

*Case II.*—Source 12 disconnected, and load 13 equal to zero impedance (short circuit). Input voltage of source 10=208 volts, 60 c.p.s. The output voltage across load 14 was 111.3 volts at zero amperes current through load 14, and the output voltage across load 14 was 110.5 volts at 4.5 amperes current through load 14, the load 14 being purely resistive.

*Case III.*—Source 10 disconnected and load 11 equal to zero impedance (short circuit). Input voltage of source 12=208 volts, 60 c.p.s. The output voltage across load 14 was 111.8 volts at zero amperes current through load 14, and the output voltage across load 14 was 110.4 volts at 4.5 amperes current through load 14, the load 14 being purely resistive.

Figure 4:
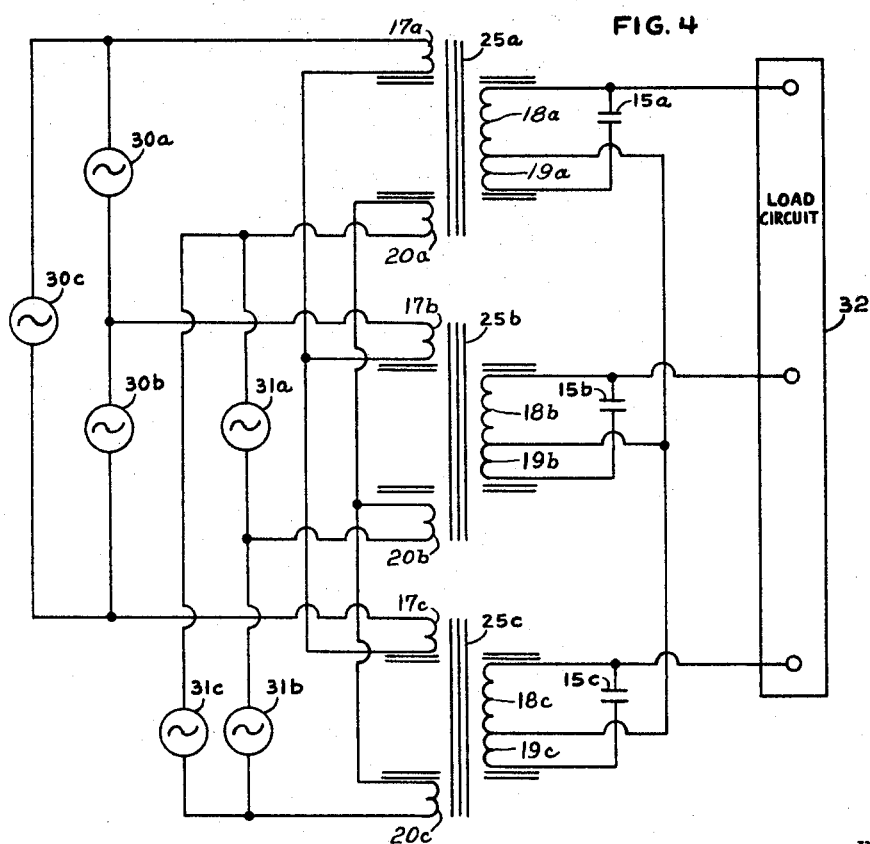
FIGURE 4 is a schematic view of a further modification of the current supply circuit of FIGURE 1.
Figure 5:
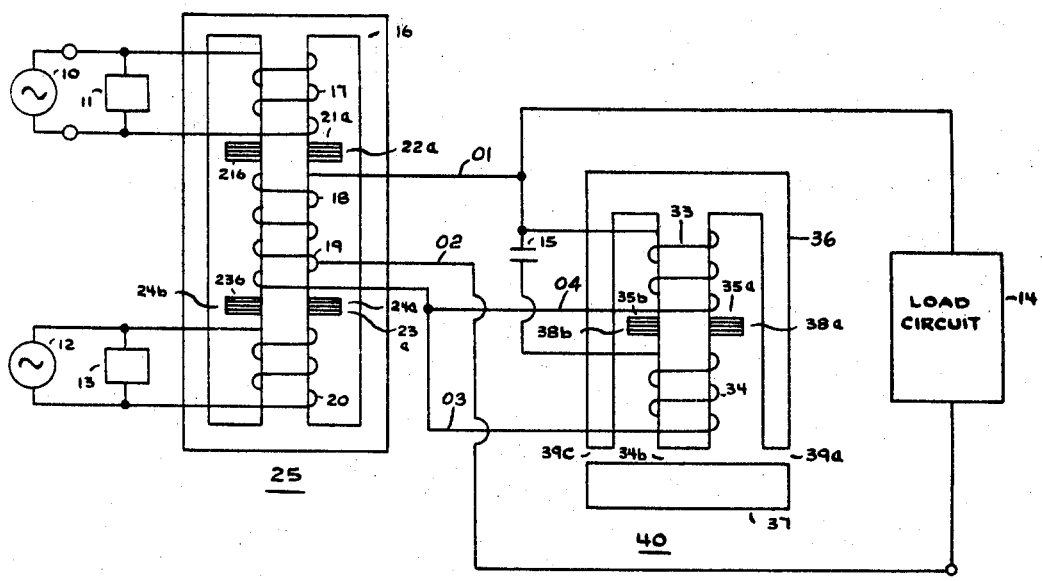
FIGURE 5 is a sectional representation of the current supply circuit of FIGURE 1 used in combination with a wave-shaping device, the details of which are set forth in U.S. patent application S.N. 257,659 which was filed on Feb. 11, 1963 by Richard E. Kuba, and assigned to the assignee of the present invention.

The current supply circuit depicted in FIGURE 1 is schematically shown in FIGURE 2, and reference thereto will simplify the understanding of further embodiments shown in FIGURES 3, 4 and 5.

FIGURE 3 shows a modification of the current supply circuit shown in FIGURES 1 and 2, and the circuit as there shown is similar to the circuit of FIGURE 1, as is evident from the corresponding identification numbers used for corresponding parts. However, in the circuit in FIGURE 3, capacitor 15 is connected to a separate winding 29 which is isolated from the output secondary winding 26. Additionally, a compensating winding 27 which is wound on the same part of the center leg C as input winding 17, and a compensating winding 28 which is wound on the same part of the center leg as input winding 20, are connected in series opposition with the output winding 26. The purpose of compensating windings 27 and 28 is to achieve better output voltage regulation for changes in the input source voltages 10 and 12 respectively.

The principle of the invention would apply to regulators energized from polyphase sources of alternating current, as in the embodiment of the invention shown in FIGURE 4. As there shown, two separate three-phase sources 30a, 30b, 30c and 31a, 31b and 31c are connected in delta configuration to the primary windings 17a, 17b, 17c and 20a, 20b, 20c respectively on three transformers 25a, 25b, and 25c. Output windings 18a, 19a; 19b, 19b; 18c, 19c; have resonating capacitors 25a, 15b and 15c respectively, connected thereacross in the manner described above. The secondary windings 18a, 18b, 18c are connected to a load circuit 32 which may be resistive and reactive. The circuit operates in the manner of FIGURE 1 to maintain "no-break" service in the event one of the power sources 30 or 31 should fail.

In order to achieve a more sinusoidal waveform in the output voltage across load 14 in the current supply circuit of FIGURE 1, the circuit arrangement depicted in FIGURE 5 may be employed. As there shown, a novel electric waveform shaping transformer 40 described more fully and shown in patent application, Ser. No. 257,659 which was filed Feb. 11, 1963 by Richard E. Kuba, is used in connection with the novel unit of FIGURE 1 modified in the manner now set forth.

With reference to FIGURE 5, the two input current sources 10 and 12 are shown with their respective partial loads 11 and 13 connected to the inputs of transformer 25. The output conductors O1, O2 of transformer 25 are connected to a load circuit 14, and conductors O1, O3, O4 are connected to windings 33, 34 of a waveshaping transformer 40 which is described in detail in U.S. patent application Ser. No. 257,659 entitled "Current Supply Apparatus Employing Electric Waveform Conversion." Resonating capacitor 15 is connected in series with winding 34 and conductors O1, O3.

The purpose of the transformer 40 is to neutralize the harmonic content of the output waveform from transformer 25 and its associated resonating capacitor 15. Transformer 40 can be made up of a butt stackup of E-laminations 36 and I-laminations 37 both of 29 gauge, grain-oriented silicon steel. A primary winding 33 and a secondary winding 34 are wound on the center leg of E-laminations 36. Magnetic shunts are formed from I-shaped laminations 35a and 35b and placed between windings 33 and 34. These laminations 35a and 35b are butt jointed to the center leg of core 36 and run transverse to the direction of the laminations composing core 36. Non-magnetic air gaps 38a and 38b are provided for adjusting the reluctance of the magnetic shunt paths formed by I-shaped laminations 38a and 38b.

Winding 33 is connected across the series combination of windings 18 and 19 of transformer 25 by conductors O1, O2 and winding 34 is connected in series with the capacitor 15 and across conductors O1, O3. Non-magnetic air gaps 39a, 39b and 39c are provided between the stack of E-laminations 36 and the stack of I-laminations 37. As explained in greater detail in U.S. patent application 257,659, under the proper design of transformer 40, the voltage appearing across winding 34 will contain the same harmonics as the voltage across capacitor 15 but the harmonics appearing across winding 34 will be in phase opposition to the harmonics across capacitor 15. By proper design of transformer 40, the harmonics of the voltage across winding 34 can be made to substantially cancel the harmonics of the voltage across capacitor 15 so that the resultant voltage across both capacitor 15 and winding 34 of transformer 40 (which is the same as the voltage across the series connection of winding 18 and winding 19) will be substantially sinusoidal at the fundamental frequency of sources 10 and 12. Since the load 14 is connected across winding 18 of transformer 25, the load voltage will also be substantially sinusoidal.

While only particular embodiments of the invention have been described and illustrated, it is apparent that modifications and alterations may be made therein. Accordingly, it is the object of the invention in the appended claims to cover all such modifications and alterations as may fall within the true spirit and scope of the invention.

What is claimed is:

1. In a current supply apparatus for providing an uninterrupted alternating current supply to a load comprising a first input means for connecting said apparatus to a first alternating current source, a second input means for connecting said apparatus to a second alternating current source, core means coupled to said input means, coil means for providing an output voltage proportionate to the changing fluxes provided in said core means by the power from said sources, means including said coil means operative to establish a ferroresonant action for driving at least a portion of said core means into magnetic saturation in each direction of magnetization on alternate cycles of the coil voltage, output means connected to provide said output voltage from said coil means to said load, and means operative responsive to the loss of power on one of said input means to regulate to a relatively small amount the power transfer from the other input means to said one input means, the power on said other input means being operative to maintain said ferroresonant action, and thereby continued supply of power by said output means to said load.

2. In a current supply apparatus for providing an uninterrupted alternating current supply to a load comprising a first input means for connecting said apparatus to a first alternating current source, a second input means for connecting said apparatus to a second alternating current source, core means coupled to said input means, control means responsive to the power supplied by said input means to said core means to establish a ferroresonant action for driving at least a portion of said core into magnetic saturation in alternate directions of magnetization of the supply voltage obtained from said source, output means for supplying current from said control means to said load, the power input on one of said input means being sufficient to maintain said ferroresonant action with loss of power on the other of said input means, and thereby continued supply of power to said output means.

3. In a current supply apparatus for providing an uninterrupted alternating current supply to a load comprising a first input means for connecting said apparatus to a first alternating current source, a second input means for connecting said apparatus to a second alternating current source, core means coupled to said input means, control means controlled by the power provided to said core means by said input means to provide a proportional output voltage including a secondary winding on said core means, capacitor means operative with said secondary winding to establish a ferroresonant action for driving at least a portion of said core means into magnetic saturation on alternate cycles of the supply voltage thereto and output means for providing the output voltage from said control means to said load, and magnetic shunt means between said secondary winding and said first input means operative responsive to loss of power on said first input means to regulate to a relatively small amount the power transfer from the second input means to said first input means, the power on said second input means being operative alone to maintain said ferroresonant action and an output voltage over said output means.

4. A current supply apparatus as set forth in claim 3 in which said output means includes a further secondary winding coupled to said core means to derive said output voltage, and means connecting said further secondary winding in series with said load.

5. A current supply apparatus as set forth in claim 3 in which said output means includes a further secondary winding coupled to said core means, and first and second compensating windings wound on said core means in series opposition with said further secondary winding and said load.

6. In a current supply apparatus for providing an uninterrupted alternating current supply to a load comprising core means, a first primary winding of said core means, a first input means for connecting said first primary winding to a first alternating current source, a second primary winding on said core means, a second input means for connecting said second primary winding to a second alternating current source, a secondary winding on said core disposed between said first and second primary windings, magnetic shunt means located between said secondary winding and said first and second primary windings, capacitor means, means connecting said capacitor means across at least a portion of said secondary winding, and means connecting said load across at least a portion of said secondary winding.

7. In a current supply apparatus for providing an uninterrupted alternating current supply to a load comprising core means, a first primary winding on said core means, a first input means for connecting said first primary winding to a first alternating current source, a second primary winding on said core means, a second input means for connecting said second primary winding to a second alternating current source, a secondary winding on said core, magnetic shunt means disposed between said secondary winding and at least one of said primary windings, capacitor means, means connecting said capacitor means across at least a portion of said secondary winding, and means connecting said load across at least a portion of said secondary winding.

8. In a current supply apparatus for providing an uninterrupted alternating current supply to a load comprising core means including a primary winding on said core means, a first input means for connecting said first primary winding to a first alternating current source, a second primary winding on said core means, a second input means for connecting said second primary winding to a second alternating current source, a secondary winding on said core means, capacitor means connected across at least a portion of said secondary winding, means connecting said load across at least a portion of said secondary winding, and magnetic shunt means for controlling one of said primary windings to operate as the secondary winding of a high reactance transformer to minimize the supply of power from the other of said primary windings to the input means for said one primary winding whenever the power on said one input means is interrupted.

9. In a current supply apparatus for providing an uninterrupted alternating current supply to a load comprising core means including a center leg, a first primary winding wound on said center leg, a first input means for connecting said first primary winding to a first alternating current source, a second primary winding wound on said center leg, a second input means for connecting said second primary winding to a second alternating current source, said first and second primary windings being connected to said sources to provide fluxes in said center leg which are additive, a secondary winding wound on said center leg, magnetic shunt path means located between said secondary winding and at least one of said primary windings, capacitor means connected across said secondary winding to produce a ferroresonant condition in at least a portion of said center leg, and means for connecting said load across at least a portion of said secondary winding.

10. In a current supply apparatus for providing an uninterrupted alternating current supply to a load comprising core means, a plurality of primary windings on said core means, means for connecting at least one of said primary windings to a first alternating current source, means for connecting at least a second one of said primary windings to a second alternating current source, at least one secondary winding on said core means, magnetic shunt means disposed at least between said secondary winding and one of said first and second primary windings, capacitor means connected across said one secondary winding, and means connecting said load across at least a portion of said secondary winding.

11. In a current supply apparatus for providing an uninterrupted alternating current from two separate three phase sources to a three phase load including at least three core means, each of which has at least two primary windings, means for connecting one of the primary windings on each of the core means to a different phase of the first one of said sources, means for connecting the other primary winding on each core means to a different phase of the second one of said sources, and control means for each of said core means for providing an output potential, each of which includes a secondary winding on its associated core means, and a capacitor connected across its secondary winding to establish ferroresonant action in its associated core means, magnetic shunt means disposed between each secondary winding and its associated primary windings on its core means, and output means for providing an output voltage from each of said control means to the three different phases of said load.

12. In a current supply apparatus for providing an uninterrupted alternating current supply to a load comprising a first input means for connecting said apparatus to a first alternating current source, a second input means for connecting said apparatus to a second alternating current source, control means controlled by the power obtained over each of said input means to provide an output voltage for said load including means operative in a current shunting action responsive to loss of power on one of said input means to regulate to a relatively small amount the power transfer from the other input means to said one input means, said control means being operative with the power on said other input means to maintain a continued supply of power to said output means.

13. In a current supply apparatus for providing an uninterrupted alternating current supply to a load comprising a first input means for connecting said apparatus to a first alternating current source, a second input means for connecting said apparatus to a second alternating current source, control means controlled by the power obtained over each of said input means to provide an output voltage for said load including means operative responsive to loss of power on one of said input means to regulate to a relatively small amount the power transfer from the other input means to said one input means, the power on said other input means being operative to maintain a continued supply of power to said output means, and waveshape transformer means for neutralizing the harmonic content of said output voltage prior to coupling to said load.

14. In a current supply apparatus for providing an uninterrupted alternating current supply to a load comprising a first input means for connecting said apparatus to a first alternating current source, a second input means for connecting said apparatus to a second alternating current source, control means controlled by the power over each of said input means to provide an output voltage for said load including means operative responsive to loss of power on one of said input means to regulate to a relatively small amount the power transfer from the other input means to said one input means, the power on said other input means being operative to maintain a continued supply of power to said output means, and a waveshape transformer including a pair of windings on a common core, means connecting one of said windings in series with said capacitor and said secondary winding, and means connecting the other of said windings across said secondary winding, magnetic shunt means on said core between said pair of windings and means for providing the output voltage of said control means from said secondary winding to said load.

References Cited

UNITED STATES PATENTS 3,061,769  10/1962  Smyth _____ 323—60 X
3,351,849  11/1967  Messenhimer _____ 323—61 X ROBERT K. SCHAEFER, Examiner.

H. J. HOHAUSER, Assistant Examiner.